United States Patent
Grabinger et al.

(10) Patent No.: US 11,334,097 B2
(45) Date of Patent: *May 17, 2022

(54) ECONOMIZER CONTROLLER PLUG AND PLAY SYSTEM RECOGNITION WITH AUTOMATIC USER INTERFACE POPULATION

(71) Applicant: Honeywell International Inc., Morris Plains, NJ (US)

(72) Inventors: Cory Grabinger, Maple Grove, MN (US); Miroslav Mikulica, Brno (CZ); Todd Kreft, Richfield, MN (US); Adrienne Thomle, Plymouth, MN (US)

(73) Assignee: Honeywell Internatioanl, Inc., Charlotte, NC (US)

( * ) Notice: Subject to any disclaimer, the term of this patent is extended or adjusted under 35 U.S.C. 154(b) by 330 days.

This patent is subject to a terminal disclaimer.

(21) Appl. No.: 16/544,767

(22) Filed: Aug. 19, 2019

(65) Prior Publication Data
US 2019/0369649 A1    Dec. 5, 2019

Related U.S. Application Data

(63) Continuation of application No. 15/585,056, filed on May 2, 2017, now Pat. No. 10,429,861, which is a continuation of application No. 14/262,237, filed on Apr. 25, 2014, now Pat. No. 9,703,299, which is a continuation of application No. 12/890,396, filed on Sep. 24, 2010, now Pat. No. 8,719,720.

(51) Int. Cl.
*G05D 23/19*    (2006.01)
*F24F 11/30*    (2018.01)

(52) U.S. Cl.
CPC .......... *G05D 23/1917* (2013.01); *F24F 11/30* (2018.01)

(58) Field of Classification Search
CPC ............................. G05D 23/1917; F24F 11/30
USPC ......................................................... 715/200
See application file for complete search history.

(56) References Cited

U.S. PATENT DOCUMENTS

| | | |
|---|---|---|
| 3,979,922 A | 9/1976 | Shavit |
| 4,182,180 A | 1/1980 | Mott |
| 4,267,967 A | 5/1981 | Beck et al. |
| 4,347,712 A | 9/1982 | Benton et al. |
| 4,379,484 A | 4/1983 | Lom et al. |
| 4,389,853 A | 6/1983 | Hile |

(Continued)

FOREIGN PATENT DOCUMENTS

| | | |
|---|---|---|
| WO | 9014556 A1 | 11/1990 |
| WO | 2009061293 A1 | 5/2009 |

OTHER PUBLICATIONS

Burr-Brown Products from Texas Instruments, "Voltage Output Programmable Sensor Conditioner PGA 309," 87 pages, Dec. 2003.

(Continued)

*Primary Examiner* — William D Titcomb
(74) *Attorney, Agent, or Firm* — Seager, Tufte & Wickhem LLP (57) ABSTRACT

An economizer controller system having a plug and play recognition approach with an automatic user interface population mechanism. A check may be made for sensors connected to the controller. The control type of the sensors may be determined. The menu structure may be repopulated based on the control type. The user interface may then be updated. This approach may be repeated as needed.

20 Claims, 10 Drawing Sheets

(56) References Cited

U.S. PATENT DOCUMENTS

| | | |
|---|---|---|
| 4,415,896 A | 11/1983 | Allgood |
| 4,423,364 A | 12/1983 | Kompelien et al. |
| 4,495,986 A | 1/1985 | Clark et al. |
| 4,497,031 A | 1/1985 | Froehling et al. |
| 4,543,796 A | 10/1985 | Han et al. |
| 4,570,448 A | 2/1986 | Smith |
| 4,580,620 A | 4/1986 | Fukumoto et al. |
| 4,591,093 A | 5/1986 | Elliot, Jr. |
| 4,605,160 A | 8/1986 | Day |
| 4,646,964 A | 3/1987 | Parker et al. |
| 4,838,484 A | 6/1989 | Kreuter |
| 4,843,084 A | 6/1989 | Parker et al. |
| 4,884,214 A | 11/1989 | Parker et al. |
| 4,931,948 A | 6/1990 | Parker et al. |
| 4,933,633 A | 6/1990 | Allgood |
| 5,103,391 A | 4/1992 | Barrett |
| 5,165,465 A | 11/1992 | Kenet |
| 5,276,630 A | 1/1994 | Baldwin et al. |
| 5,292,280 A | 3/1994 | Janu et al. |
| 5,311,451 A | 5/1994 | Barrett |
| 5,385,297 A | 1/1995 | Rein et al. |
| 5,390,206 A | 2/1995 | Rein et al. |
| 5,418,131 A | 5/1995 | Butts |
| 5,446,677 A | 8/1995 | Jensen et al. |
| 5,535,814 A | 7/1996 | Hartman |
| 5,564,626 A | 10/1996 | Kettler et al. |
| 5,590,830 A | 1/1997 | Kettler et al. |
| 5,597,354 A | 1/1997 | Janu et al. |
| 5,602,758 A | 2/1997 | Lincoln et al. |
| 5,605,280 A | 2/1997 | Hartman |
| 5,706,190 A | 1/1998 | Russ et al. |
| 5,719,408 A | 2/1998 | Yamamoto et al. |
| 5,762,420 A | 6/1998 | Mills |
| 5,772,501 A | 6/1998 | Merry et al. |
| 5,791,408 A | 8/1998 | Seem |
| 5,801,940 A | 9/1998 | Russ et al. |
| 5,874,736 A | 2/1999 | Pompei |
| 5,970,430 A | 10/1999 | Burns et al. |
| 6,006,142 A | 12/1999 | Seem et al. |
| 6,026,352 A | 2/2000 | Burns et al. |
| 6,125,540 A | 10/2000 | Court et al. |
| 6,126,540 A | 10/2000 | Janu et al. |
| 6,161,764 A | 12/2000 | Jatnieks |
| 6,223,544 B1 | 5/2001 | Seem |
| 6,249,100 B1 | 6/2001 | Lange |
| 6,250,382 B1 | 6/2001 | Rayburn et al. |
| 6,415,617 B1 | 7/2002 | Seem |
| 6,487,457 B1 | 11/2002 | Hull et al. |
| 6,488,081 B2 | 12/2002 | Rayburn et al. |
| 6,491,094 B2 | 12/2002 | Rayburn et al. |
| 6,514,138 B2 | 2/2003 | Estepp |
| 6,578,770 B1 | 6/2003 | Rosen |
| 6,581,847 B2 | 6/2003 | Kline et al. |
| 6,608,558 B2 | 8/2003 | Sen et al. |
| 6,609,967 B2 | 8/2003 | Sharp et al. |
| 6,629,886 B1 | 10/2003 | Estepp |
| 6,634,422 B2 | 10/2003 | Rayburn et al. |
| 6,640,162 B1 | 10/2003 | Swanson |
| 6,756,998 B1 | 6/2004 | Bilger |
| 6,778,945 B2 | 8/2004 | Chassin et al. |
| 6,792,319 B1 | 9/2004 | Bilger |
| 6,792,767 B1 | 9/2004 | Pargeter et al. |
| 6,826,920 B2 | 12/2004 | Wacker |
| 6,851,621 B1 | 2/2005 | Wacker et al. |
| 6,916,239 B2 | 7/2005 | Siddaramanna et al. |
| 6,988,671 B2 | 1/2006 | DeLuca |
| 7,036,559 B2 | 5/2006 | Stanimirovic |
| 7,044,397 B2 | 5/2006 | Bartlett et al. |
| 7,055,759 B2 | 6/2006 | Wacker et al. |
| 7,059,536 B2 | 6/2006 | Schneider et al. |
| 7,099,748 B2 | 8/2006 | Rayburn et al. |
| 7,104,460 B2 | 9/2006 | Masen et al. |
| 7,106,460 B2 | 9/2006 | Haines et al. |
| 7,114,554 B2 | 10/2006 | Bergman et al. |
| 7,177,776 B2 | 2/2007 | Whitehead |
| 7,222,800 B2 | 5/2007 | Wruck |
| 7,258,280 B2 | 8/2007 | Wolfson |
| 7,378,954 B2 | 5/2008 | Wendt |
| 7,398,821 B2 | 7/2008 | Rainer et al. |
| 7,434,413 B2 | 10/2008 | Wruck |
| 7,475,828 B2 | 1/2009 | Bartlett et al. |
| 7,484,668 B1 | 2/2009 | Eiler |
| 7,525,787 B2 | 4/2009 | Dhindsa et al. |
| 7,546,200 B2 | 6/2009 | Justice |
| 7,565,205 B2 | 7/2009 | Palti |
| 7,574,871 B2 | 8/2009 | Bloemer et al. |
| 7,632,178 B2 | 12/2009 | Meneely, Jr. |
| 7,641,126 B2 | 1/2010 | Schultz et al. |
| 7,758,407 B2 | 7/2010 | Ahmed |
| 7,797,080 B2 | 9/2010 | Durham, III |
| 7,827,813 B2 | 11/2010 | Seem |
| 7,891,573 B2 | 2/2011 | Finkam et al. |
| 7,904,830 B2 | 3/2011 | Hoglund et al. |
| 7,935,729 B2 | 5/2011 | Harbige et al. |
| 7,979,163 B2 | 7/2011 | Terlson et al. |
| 7,987,680 B2 | 8/2011 | Hamada et al. |
| 7,992,630 B2 | 8/2011 | Springer et al. |
| 8,027,742 B2 | 9/2011 | Seem et al. |
| 8,066,558 B2 | 11/2011 | Thomle et al. |
| 8,147,302 B2 | 4/2012 | Desrochers et al. |
| 8,185,244 B2 | 5/2012 | Wolfson |
| 8,195,355 B2 | 6/2012 | Inoue |
| 8,200,344 B2 | 6/2012 | Li et al. |
| 8,200,345 B2 | 6/2012 | Li et al. |
| 8,219,249 B2 | 7/2012 | Harrod et al. |
| 8,239,168 B2 | 8/2012 | House et al. |
| 8,326,464 B2 | 12/2012 | Clanin |
| 8,364,318 B2 | 1/2013 | Grabinger et al. |
| 8,412,654 B2 | 4/2013 | Montalvo |
| 8,433,446 B2 | 4/2013 | Grohman et al. |
| 8,515,584 B2 | 8/2013 | Miller et al. |
| 8,583,289 B2 | 11/2013 | Stack et al. |
| 8,719,385 B2 | 5/2014 | Nair et al. |
| 8,719,720 B2 | 5/2014 | Grabinger et al. |
| 9,255,720 B2 | 2/2016 | Thomle et al. |
| 9,703,299 B2 | 7/2017 | Grabinger et al. |
| 9,765,986 B2 | 9/2017 | Thomle et al. |
| 10,429,861 B2 * | 10/2019 | Grabinger ............... F24F 11/30 |
| 10,544,955 B2 * | 1/2020 | Przybylski .......... G06F 9/45512 |
| 10,678,227 B2 * | 6/2020 | Przybylski ............. G06Q 50/06 |
| 10,686,622 B2 * | 6/2020 | Maricar ............. H04L 12/2825 |
| 11,070,081 B2 * | 7/2021 | Asp ........................ H04Q 9/02 |
| 2003/0181158 A1 | 9/2003 | Schell et al. |
| 2004/0071155 A1 | 4/2004 | Marino et al. |
| 2005/0120583 A1 | 6/2005 | Huttlin |
| 2006/0004492 A1 | 1/2006 | Terlson et al. |
| 2006/0009862 A1 | 1/2006 | Imhof et al. |
| 2006/0107670 A1 | 5/2006 | Thomle et al. |
| 2006/0117769 A1 | 6/2006 | Helt et al. |
| 2006/0130502 A1 | 6/2006 | Wruck et al. |
| 2007/0023533 A1 | 2/2007 | Liu |
| 2007/0037507 A1 | 2/2007 | Liu |
| 2007/0043478 A1 | 2/2007 | Ehlers et al. |
| 2007/0045429 A1 | 3/2007 | Chapman, Jr. et al. |
| 2007/0045431 A1 | 3/2007 | Chapman, Jr. et al. |
| 2007/0084938 A1 | 4/2007 | Liu |
| 2007/0260708 A1 | 11/2007 | Beaton et al. |
| 2007/0289322 A1 | 12/2007 | Mathews |
| 2008/0052757 A1 | 2/2008 | Gulati et al. |
| 2008/0176503 A1 | 7/2008 | Stanimirovic |
| 2008/0179408 A1 | 7/2008 | Seem |
| 2009/0099668 A1 | 4/2009 | Lehman et al. |
| 2009/0140058 A1 | 6/2009 | Koster et al. |
| 2009/0143915 A1 | 6/2009 | Dougan et al. |
| 2009/0143918 A1 | 6/2009 | Amundson et al. |
| 2009/0158188 A1 | 6/2009 | Bray et al. |
| 2010/0070907 A1 | 3/2010 | Harrod et al. |
| 2010/0088261 A1 | 4/2010 | Montalvo |
| 2010/0105311 A1 | 4/2010 | Meneeley, Jr. |
| 2010/0106308 A1 | 4/2010 | Filbeck et al. |
| 2010/0106333 A1 | 4/2010 | Grohman et al. |
| 2010/0106334 A1 | 4/2010 | Grohman et al. |
| 2010/0106543 A1 | 4/2010 | Marti |
| 2010/0198411 A1 | 8/2010 | Wolfson |

(56) References Cited

U.S. PATENT DOCUMENTS

| | | | |
|---|---|---|---|
| 2011/0010621 A1 | 1/2011 | Wallaert et al. | |
| 2011/0078563 A1 | 3/2011 | Archer | |
| 2011/0093493 A1 | 4/2011 | Nair et al. | |
| 2011/0097988 A1 | 4/2011 | Lord | |
| 2011/0113360 A1 | 5/2011 | Johnson et al. | |
| 2011/0172831 A1 | 7/2011 | Kreft et al. | |
| 2011/0264273 A1 | 10/2011 | Grabinger et al. | |
| 2011/0264275 A1 | 10/2011 | Thomle et al. | |
| 2011/0264280 A1 | 10/2011 | Grabinger et al. | |
| 2012/0079425 A1* | 3/2012 | Grabinger | F24F 11/30 715/810 |

OTHER PUBLICATIONS

California Energy Commission, "2008 Building Energy Efficient Standards for Residential and Nonresidential Buildings," 176 pages, Dec. 2008.
California Energy Commission, "Reference Appendices for the 2008 Building Energy Efficient Standards for Residential and Nonresidential Buildings," 363 pages, Dec. 2008, revised Jun. 2009.
Carrier Corporation, "Getting More for Less, How Demand Controlled Ventilation Increases Air Quality and Reduces Costs," 7 pages, Dec. 1998.
Femp, "Demand-Controlled Ventilation Using CO2 Sensors," Federal Technology Alert, A New Technology Demonstration Publication, 28 pages, Mar. 2004.
Honeywell, "Product Information Sheet," pp. 134-135, prior to Sep. 24, 2010.
Honeywell, "W6210A,D and W7210A,D Solid State Economizer Logic Module," Product Data, 24 pages, prior to Sep. 24, 2010.
Honeywell, "W7212, W7213, W7214 Economizer Logic Modules for Ventilation Control," Product Data, 16 pages, 2004.
Honeywell, "W7212, W7213, W7214 Economizer Logic Modules for Ventilation Control," Product Data, 24 pages, revised Mar. 2010.
Honeywell, "Building Control Systems, Use of Demand Control Ventilation in Your HVAC System," 1 page, Nov. 2005.
Honeywell, Fresh Air Economizer™ Systems, 2 pages, 1999.
http://content.honeywell.com/building/components/pr/econstudy.asp., "Honeywell Hvac—Economizer Study," 3 pages, printed Oct. 21, 2004.
http://www.automatedbuildings.com/releases/mar09/090312111454honeywell.htm, "Honeywell Introduces Economizer Savings Tool and Selectable Dry Bulb Temperature Sensor to Reduce Energy Consumption," 2 pages, Mar. 2009.
http://www.colemparmer.com/Assets/manual, "Digi-Sense Humidity Meter Model No. 60020-40, 68X309920 Rev. 0," OakTon BlueTech Instruments, 28 pages, Jun. 2004.
http://www.nmschembio.org.uk/dm_uk/documents/lgcvam2003032_xsjgl.pdf, "Preparation of Calibration Curves, A Guide to Best Practice," LGC/VAM2003/032, 30 pages, Sep. 2003.
http://www.pexsupply.com/Honeywell-W7210A1001-Series-72-Economizer-TwoSPDT . . . , "Series-72-Economizer-TwoSPDT One 2-10VDC," SKU: W7210A1001, 2 pages, printed Sep. 7, 2010.
http://www.ti.com/lit/an/sboa111/sboa111.pdf, "A Practical Technique for Minimizing the Number of Measurements in Sensor Signal Conditioning Calibration," Texas Instruments, Application Report SBOA111, pp. 1-9, Jun. 2005.
Kingrey et al., "Checking Economizer Operation," Washington State University Extension Energy Program, 3 pages, Feb. 6, 2009.
New Buildings Institute, "Commercial Rooftop HVAC Energy Savings Research Program, Draft(A) Final Project Report," 99 pages, Mar. 25, 2009.
Purpleswift, "DC6 AHU Economizer Unit," 2 pages, downloaded Jul. 1, 2010.
Rooftop Systems, Inc., "Economizer Catalog, Version 1.1," 20 pages, downloaded Jul. 1, 2010.
Taylor, "Comparing Economizer Relief Systems," ASHRAE Journal, pp. 33-42, Sep. 2000.
Belimo, "Belimo ZIP Economizer, Fault Detection and Diagnostics Guide," 4 pages, Sep. 2013.
Belimo, "Belimo ZIP Economizer, Software Version 1.10.000," Installation and Operation Manual, 46 pages, Jun. 2016.
Belimo, "Belimo ZIP Economizer," Installation and Operation Manual, 36 pages, Mar. 2013.
http://www.zipeconomizer.com/articlesresources/, "Articles/Resources, Zip Economizer," 5 pages, printed Oct. 17, 2017.

* cited by examiner

ECONOMIZER CONTROLLER PLUG AND PLAY SYSTEM RECOGNITION WITH AUTOMATIC USER INTERFACE POPULATION

This application is a continuation of U.S. patent application Ser. No. 15/585,056, filed May 2, 2017, and entitled "Economizer Controller Plug and Play System Recognition with Automatic User Interface Population, which in turn is a continuation of U.S. patent application Ser. No. 14/262,237, filed Apr. 25, 2014, and entitled "Economizer Controller Plug and Play System Recognition with Automatic User Interface Population", which in turn is a continuation of U.S. patent application Ser. No. 12/890,396, filed Sep. 24, 2010, and entitled "Economizer Controller Plug and Play System Recognition with Automatic User Interface Population", now U.S. Pat. No. 8,719,720, issued May 6, 2014. U.S. patent application Ser. No. 12/890,396, filed Sep. 24, 2010, is hereby incorporated by reference. U.S. patent application Ser. No. 14/262,237, filed Apr. 25, 2014, is hereby incorporated by reference. U.S. patent application Ser. No. 15/585,056, filed May 2, 2017, is hereby incorporated by reference.

BACKGROUND

The present disclosure pertains to controllers and particularly to economizer controllers. More particularly, the disclosure pertains to user interfaces of economizer controllers.

SUMMARY

The disclosure reveals an economizer controller system having a plug and play recognition approach with an automatic user interface population mechanism. A check may be made for sensors connected to the controller. The control type of the sensors may be determined. The menu structure may be repopulated based on the control type. The user interface may then be updated. This approach may be repeated as needed.

DESCRIPTION

There may be numerous economizer system configurations and control types. A system configuration may include many combinations of mixed air temperature sensing, outdoor air temperature sensing, return air temperature sensing, outdoor air humidity sensing, return air humidity sensing, discharge air temperature sensing, discharge air humidity sensing, and/or other sensing. The system control types may consist of single ended drybulb control, differential drybulb control, single ended enthalpy control, differential enthalpy control, hybrid control strategies, and/or other controls. Each system configuration and control type may have specific user interface (UI) population and setup requirements.

The present approach may solve the issue by implementing an automatic system configuration determination routine in controller firmware. Periodically, the controller may search for attached sensors and determine the appropriate control type and populate the user interface menu structure accordingly. The controller may have a graphical user interface.

An economizer/DCV (demand controlled ventilation) controller may have the present system recognition and automatic user interface population routine implemented in firmware.

Figure 1:
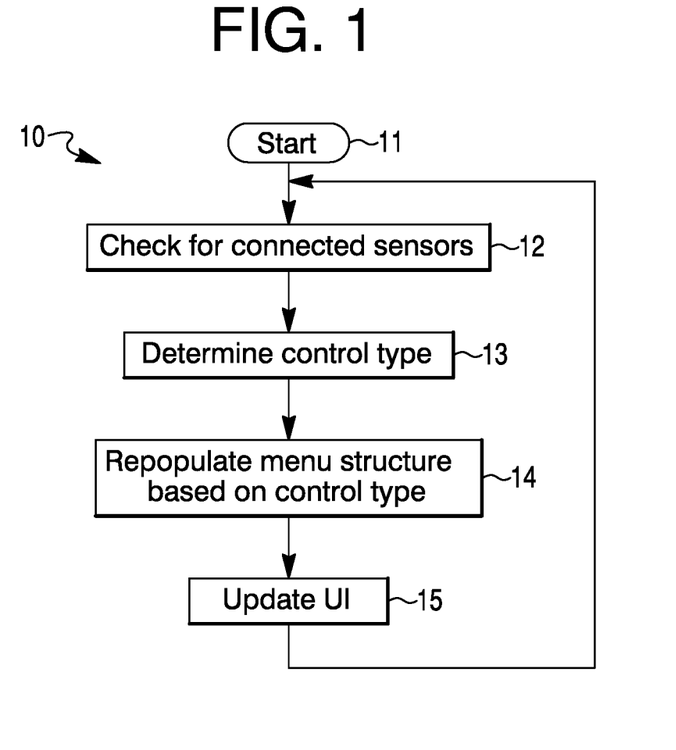
FIG. 1 is a flow diagram for the subject economizer controller plug and play system recognition with automatic user interface population.

FIG. 1 is a flow diagram 10 for the subject economizer controller plug and play system recognition with automatic user interface population. From a start 11, the system may check for connected sensors at symbol 12. The control type of the sensors may be determined at symbol 13. The menu structure may be repopulated based on control type at symbol 14. Then the user interface may be updated at symbol 15. The approach may be redone to check again for connected sensors by returning to symbol 12.

Figure 2A:
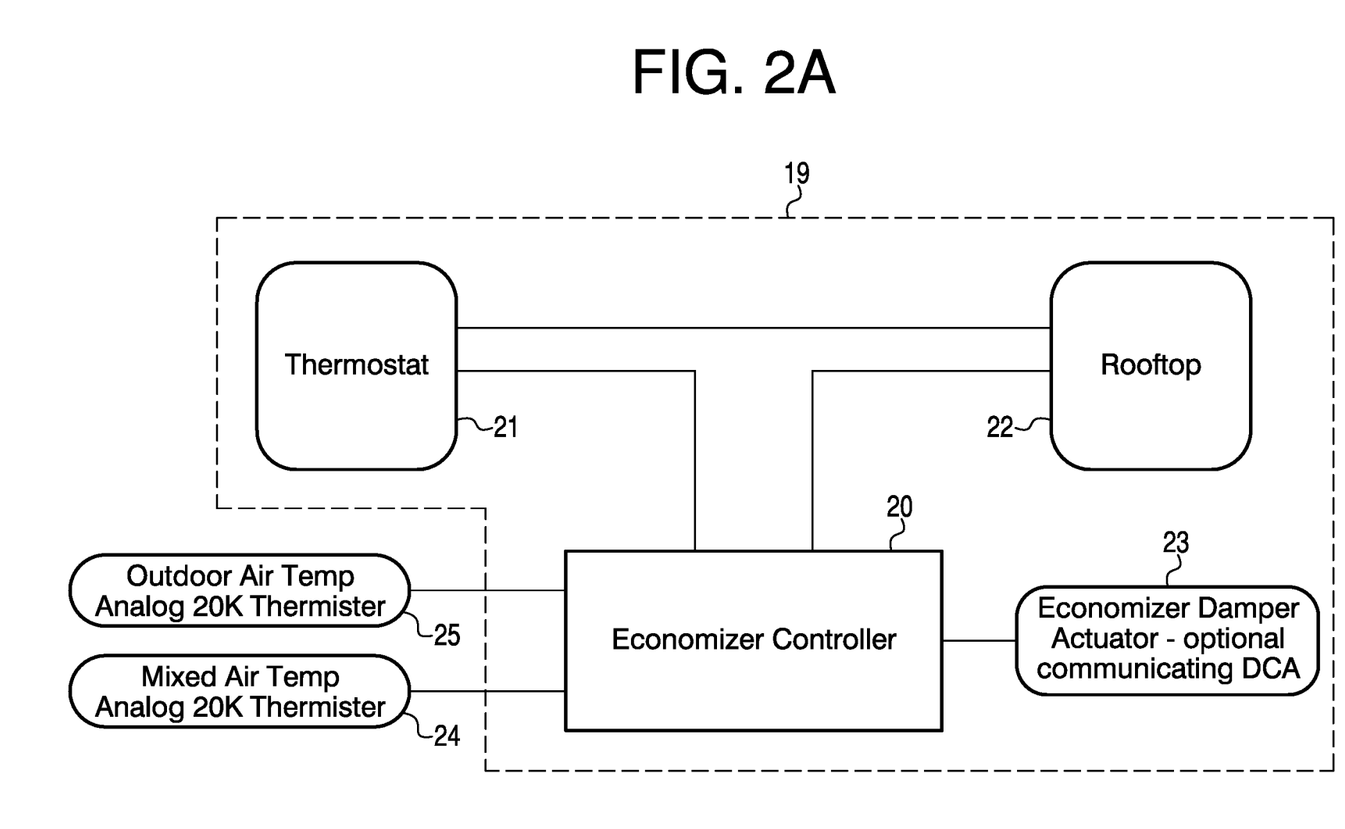
FIGS. 2a, 2b, 3a, 3b, 4a, 4b, 5a and 5b are diagrams of several examples of configurations and menus based on mode.

FIGS. 2a-5b are diagrams of several examples of configurations and menus based on mode. In FIG. 2a, the setup may begin with an economizer controller 20 having a thermostat 21 connected to the economizer 20 and a rooftop unit 22. Thermostat 21 and rooftop 22 may be connected to economizer controller 20. Also connected to controller 20 may be an economizer damper actuator 23. There may be an optional communicating demand control actuator (DCA). Components 20-23 may make up a combination 19 that is present in FIGS. 2a, 3a, 4a and 5a. FIGS. 2b, 3b, 4b and 5b reveal a menu structure with headings of status 31, setpoints 32, system setup 33, advanced 34 and checkout 35.

Figure 2B:
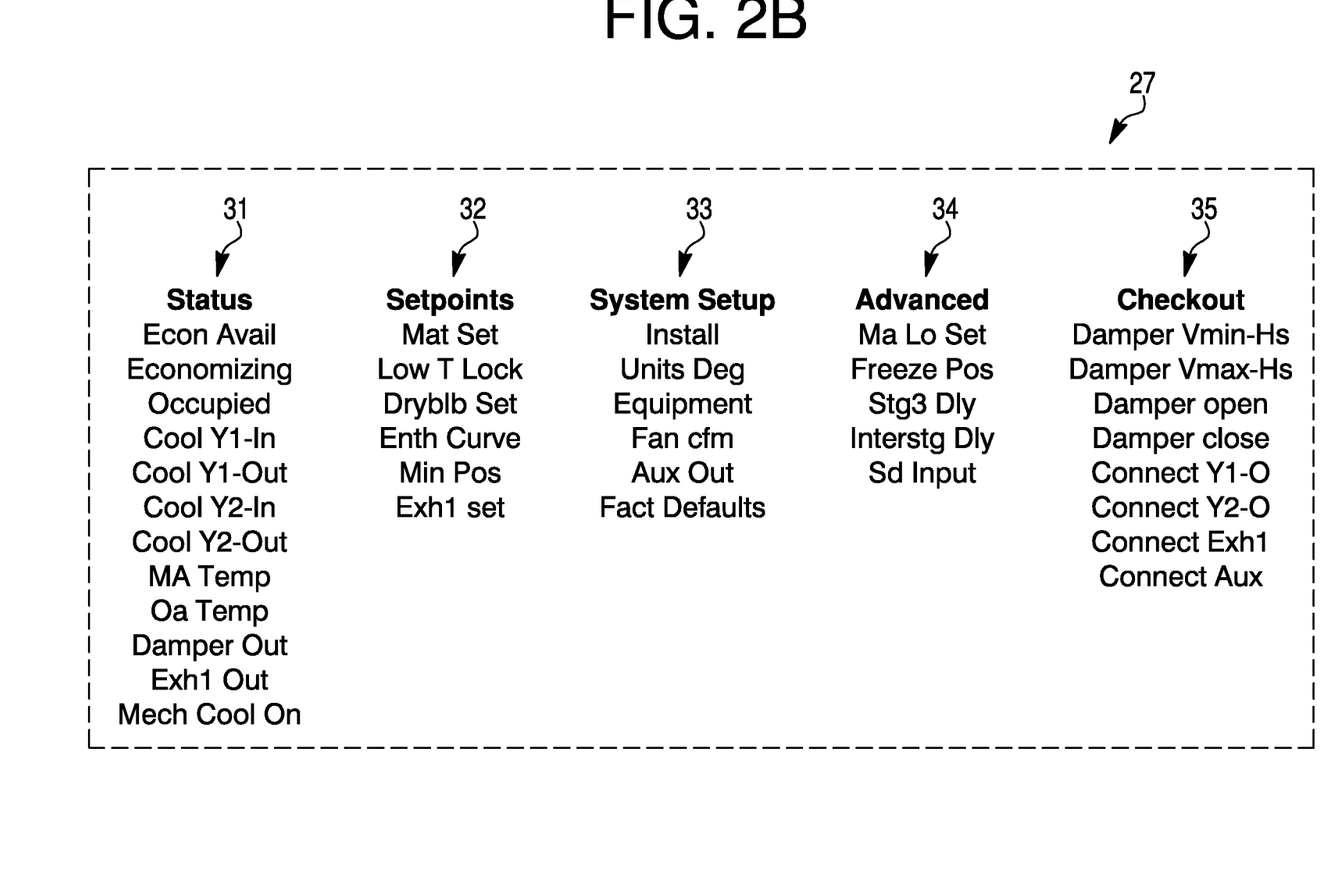

FIG. 2a is a diagram for a setup for a single dry bulb. A mixed air temperature (MAT) analog 20K ohm thermister 24 and an outdoor air temperature (OAT) analog 20K ohm thermister 25 may be connected to controller 20 of combination 19. FIG. 2b is a table 27 revealing a menu associated with the single dry bulb of a check for connected sensors, determination of control type, repopulation of menu structure based on control type, and update of user interface of the process 10 of FIG. 1. The headings may incorporate Status 31, Setpoint 32, System Setup 33, Advanced 34 and Checkout 35. Status 31 may have a listing of "Econ Avail," "Economizing", "Occupied", "Cool Y1-In", "Cool Y1-Out", "Cool Y2-In", "Cool Y2-Out", "MA Temp", "OA Temp", "Damper Out", "Exh1 Out" and "Mech Cool On". Setpoints 32 may have a listing of "Mat Set", "Low T Lock" "Dryblb Set", "Enth Curve", "Min Pos" and "Exh1 Set". System Setup 33 may have a listing of "Install", "Units Deg", "Equipment", "Fan cfm", "Aux Out" and "Fact Defaults". Advanced 34 may have a listing of "Ma Lo Set", "Freeze Pas", "Sta3 Dly", "Interstg Dly" and "Sd Input". Checkout 35 may have a listing of "Damper Vmin-Hs", "Damper Vmax-Hs", "Damper open", "Damper close", "Connect Y1-O", "Connect Y2-O", "Connect Exh1" and "Connect Aux".

Figure 3A:
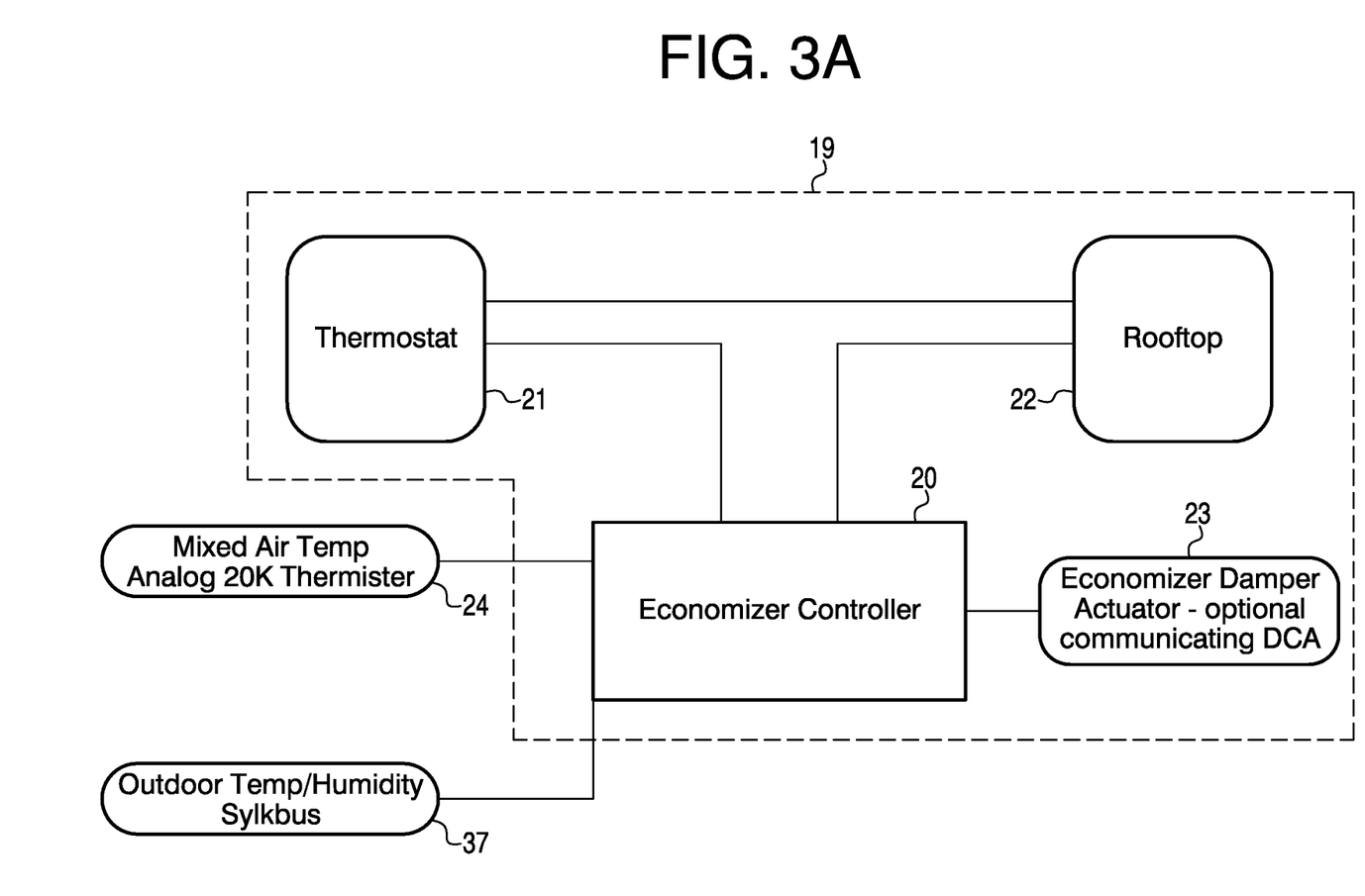
Figure 3B:
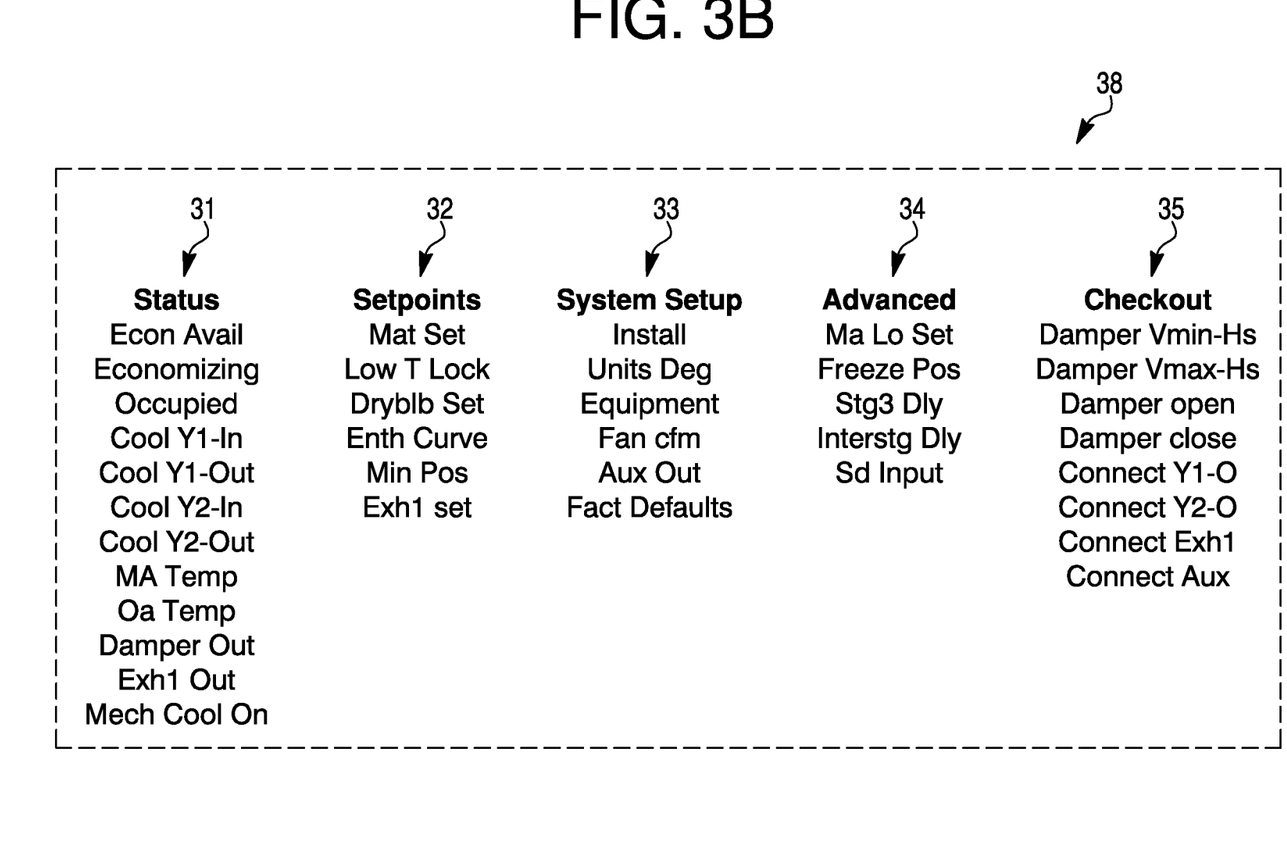

FIG. 3a is a diagram for a setup for single enthalpy. The mixed air temperature analog 20K ohm thermister 24 and an outdoor temp/humidity sylkbus (Sylk™ bus) 37 may be connected to controller 20 of combination 19. FIG. 3b is a table 38 revealing a menu associated with the single enthalpy of a check for connected sensors, determination of control type, repopulation of menu structure based on control type, and update of the user interface of process 10. The headings of table 38 in FIG. 3b, as in FIG. 2b and FIGS. 4b and 5b, may incorporate Status 31, Setpoints 32, System Setup 33, Advanced 34 and Checkout 35. The headings Setpoints 32, System Setup 33, Advanced 34 and Checkout 35 of table 38 of FIG. 3b may have the same listings as the corresponding headings 32-35 of table 28 in FIG. 2b. Status 31 of FIG. 3b may have an additional item "OA Hum" after "OA Temp". Sylk™ bus may be a 2-wire, non-polarity sensitive, communications and power bus. Sylk™ is a trademark of Honeywell International Inc. of Morristown, N.J.

Figure 4A:
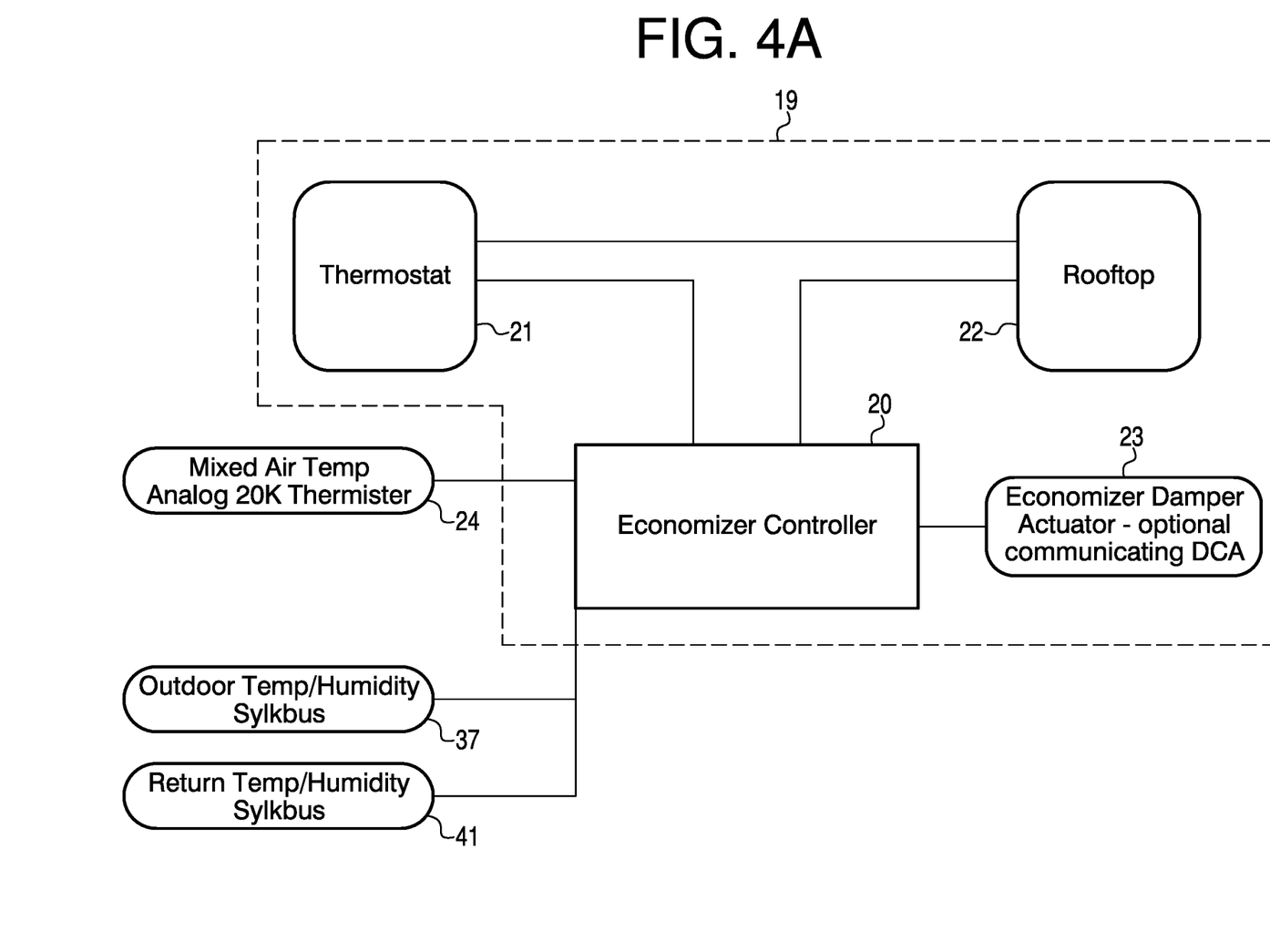
Figure 4B:
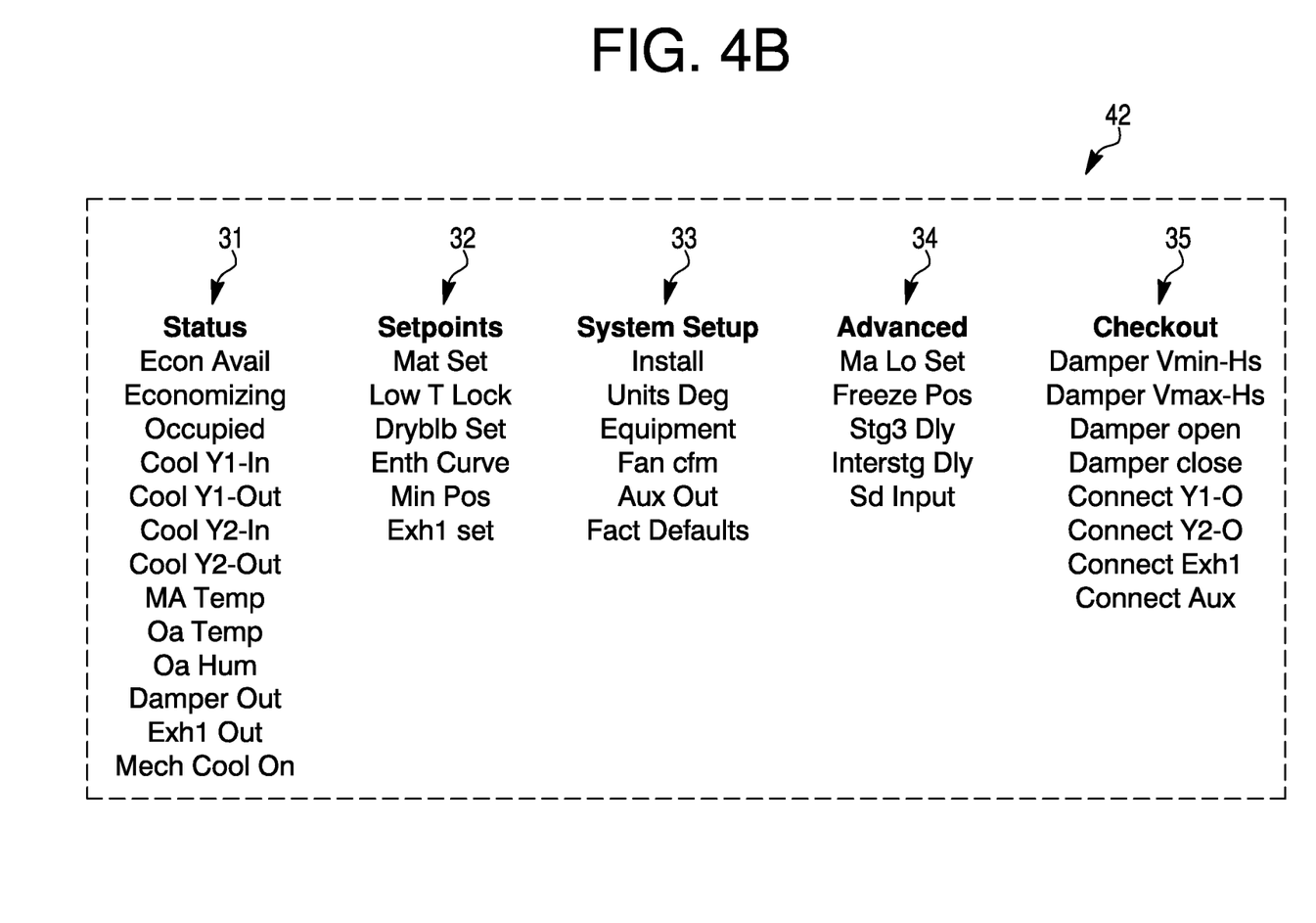

FIG. 4a is a diagram for a setup for differential enthalpy without DCV. The mixed air temperature analog 20K ohm thermister 24, the outdoor temp/humidity Sylkbus 37 and a return temp/humidity Sylkbus 41 may be connected to controller 20 of combination 19. FIG. 4b is a table 42 revealing a menu associated with the differential enthalpy without DCV of a check for connected sensors, determination of control type, repopulation of menu structure based on control type, and update of the user interface of process 10. The headings in FIG. 4b of table 42 may be the same as the headings in table 27. The listings of the headings in table 42 may differ from the listings in table 27 of FIG. 2b in that the "OA Hum', "RA Temp' and "RA Hum" may be present after "OA Temp" in the listing of Status 31. "Dryblb Set" and "Enth Curve" may be absent after "Low T Lock" in Setpoints 32 when compared with Setpoints 32 of table 27 in FIG. 2b. The remaining headings of table 42 may have the same listings as the corresponding headings of table 27.

Figure 5A:
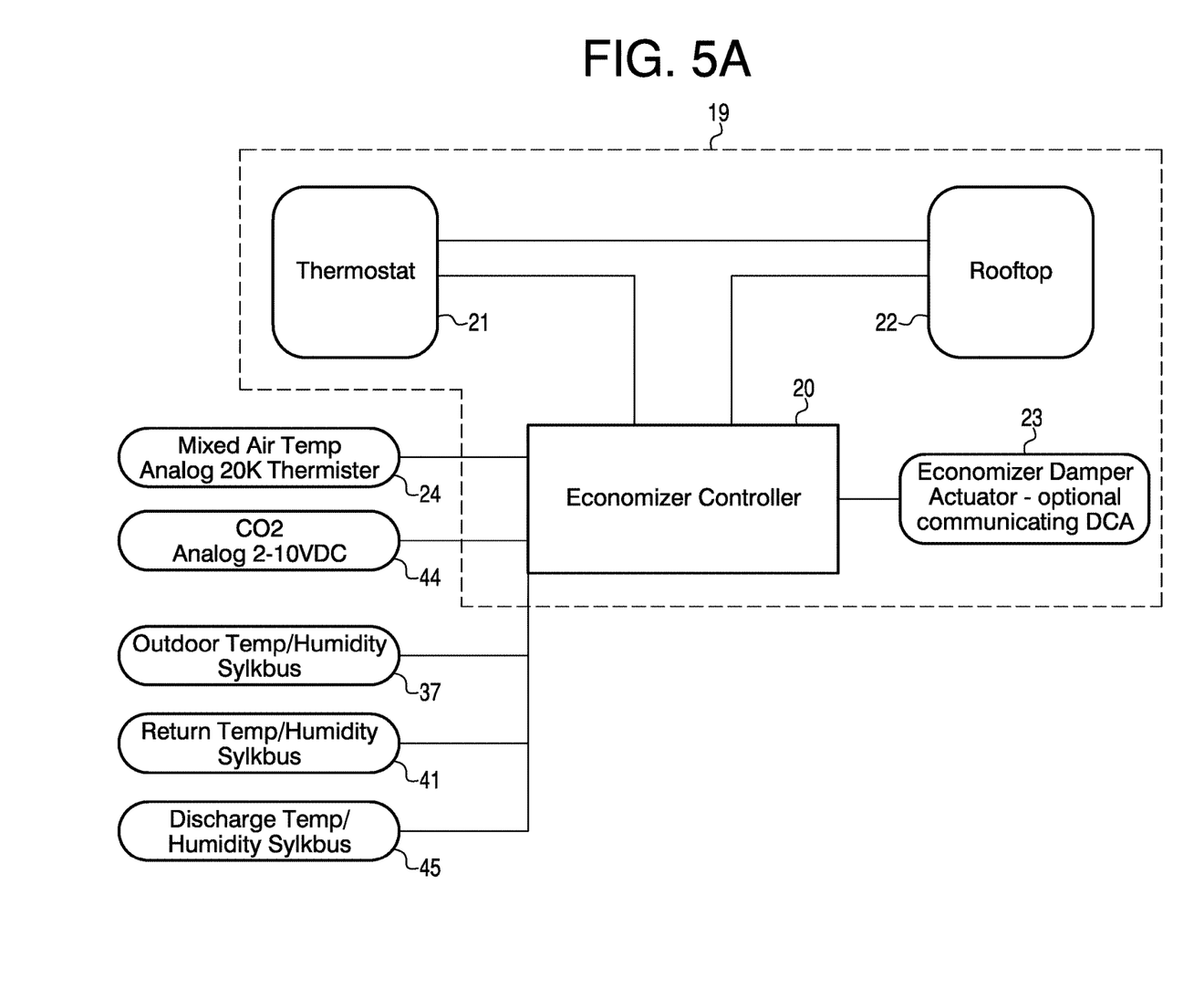
Figure 5B:
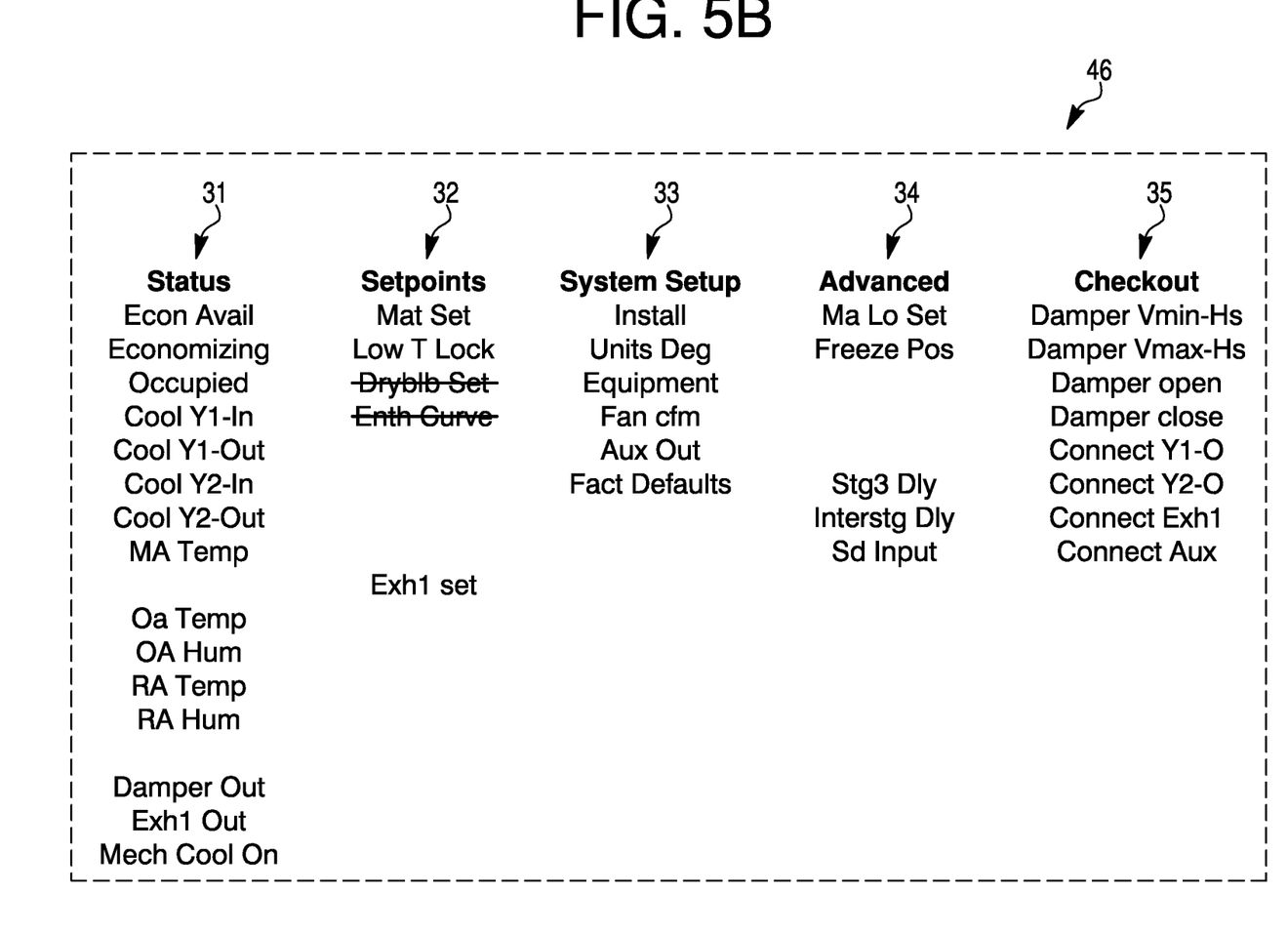

FIG. 5a is a diagram for a setup for differential enthalpy with DCV. The mixed air temperature analog 20K ohm thermister 24, the outdoor temp/humidity Sylkbus 37, the return temp/humidity Sylkbus 41, a CO2 analog 2-10 VDC 44 and a discharge temp/humidity Sylkbus 45 may be connected to controller 20 of combination 19. FIG. 5b is a table 46 revealing a menu associated with the differential enthalpy with DCV of a check for connected sensors, determination of control type, repopulation of menu structure based on control type and update of the user interface of process 10. The headings of table 46 in FIG. 5b may be the same as the headings in table 27. The listings in table 46 may differ from the listings in table 27 of FIG. 2b in that "DA Temp" may be added after "MA Temp", "OA Hum", "RA Temp", "RA Hum", "in CO2" and "DCV Status" may be added after "OA Temp", in the listing of Status 31. "Dryblb Set", "Enth Curve" and "Min Pos" may be absent after "Low T Lock" in Setpoints 32 when compared with Setpoints 32 of table 27 in FIG. 2b. "DCV Set", "VentMax" and "VentMin" may be added to the listing of heading Setpoints 32 of table 46 when compared to table 27 in FIG. 2b. "CO2 Zero" may be added to the listing of the Advanced 34 heading. The Checkout 35 heading in table 46 may have the same listing as the Checkout 35 heading of table 27 in FIG. 2b.

Figure 6:
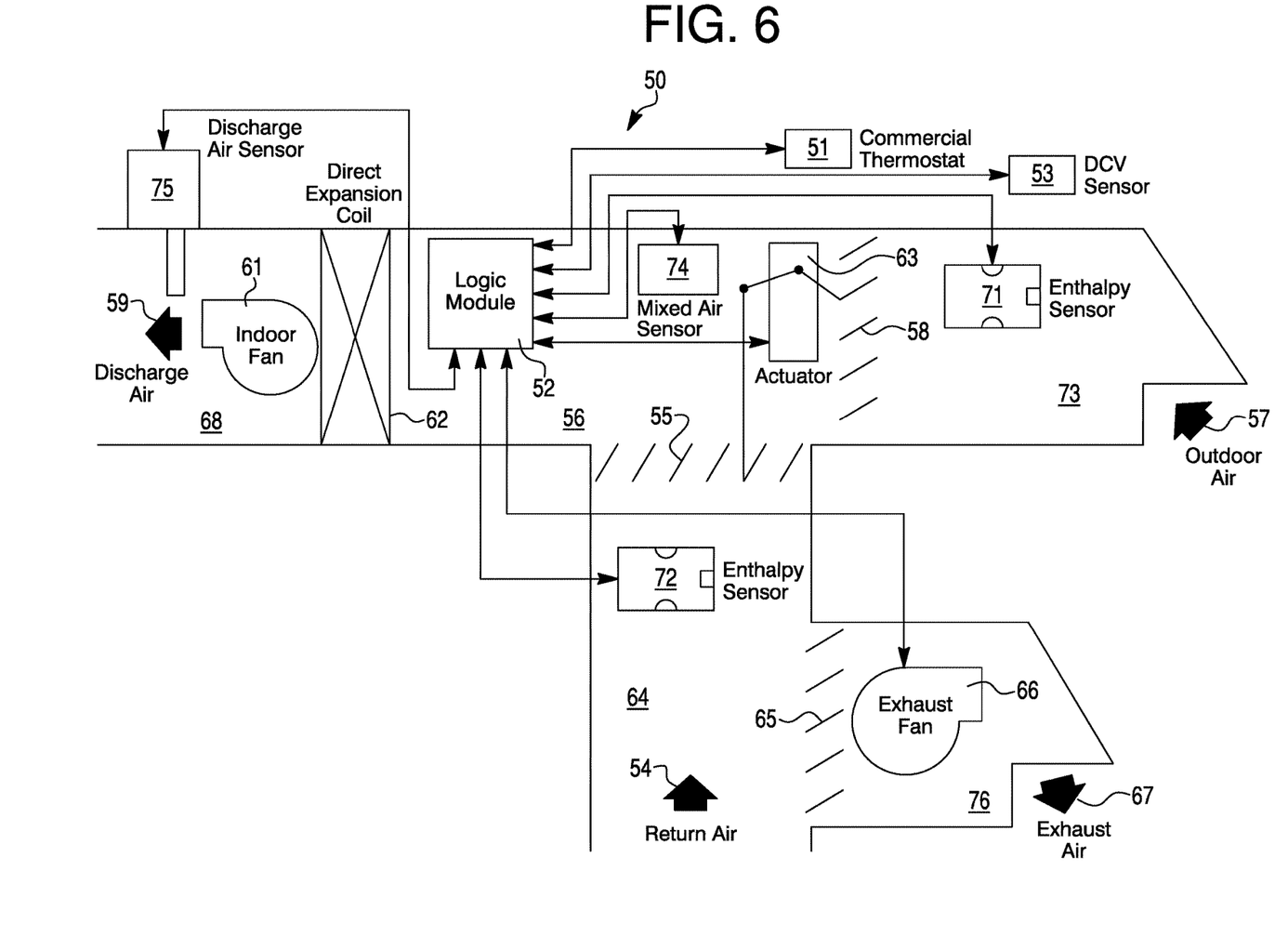
FIG. 6 is a schematic diagram of a representative economizer controller system which may be an illustrative system associated with examples of the present disclosure.

FIG. 6 is a schematic diagram of a representative economizer controller system 50 which may be an illustrative system associated with the present approach. A thermostat 51 may be connected to an economizer logic module 52. A demand control ventilation sensor 53 may be connected to module 52. Return air 54 may come in through a recirculation damper 55 into a mixing air chamber 56 where air 54 may be mixed with outdoor air 57 coming through an intake damper 58. Mixed air may be discharge air 59 which is drawn by an indoor fan 61 through a direct expansion coil 62 and provided to a space being conditioned via a supply duct 68. Dampers 55 and 58 may be controlled by an actuator 63 which is connected to module 52. Damper 58 may close as damper 55 opens and vice versa. A portion of return air 54 may taken from return air duct 64 and drawn through a damper 65 by an exhaust fan 66 through an exhaust duct 76 to outside the system as exhaust air 67. Exhaust fan 66 may be connected to module 52. The position of damper 65 may be determined at least in part by module 52. The proportions of outdoor air 57 and recirculated air 54 taken into supply duct 68, as well as the amount of air 67 from return air duct 64, may be controlled by intake damper 58, recirculation damper 55 and exhaust damper 65. An enthalpy sensor 71 situated in an intake or outdoor air duct 73 may be connected to module 52. For differential enthalpy, a second enthalpy sensor 72, along with enthalpy sensor 71, may be connected to module 52.

A mixed air sensor 74 may be situated in chamber or duct 56, or a discharge air sensor 75 may situated in chamber or duct 68, but not necessarily both. One or the other of or both sensors 74 and 75 may be connected to logic module 52. There may be situations where there would be both a mixed air sensor in the mixed air chamber and a separate discharge air sensor in the discharge chamber or duct. There may also be situations where there is not a discharge air sensor but that a mixed air sensor is mounted in the discharge chamber or duct.

Economizer controller systems may save energy in buildings by using cool outside air as a means of cooling the indoor space. When the enthalpy of the outside air is less than the enthalpy of the recirculated air, conditioning the outside air may be more energy efficient than conditioning recirculated air. When the outside air is both sufficiently cool and sufficiently dry (depending on the climate), the amount of enthalpy in the air is acceptable to the control, no additional conditioning of it is necessarily needed. This portion of the economizer control scheme may be referred to as free cooling.

Economizer systems may reduce HVAC energy costs in cold and temperate climates while also potentially improving indoor air quality, but they might often not be appropriate in hot and humid climates. With the proper controls, economizer systems may be used in climates which experience various weather systems.

When the outside air's dry-bulb and wet-bulb temperatures are low enough, economizer systems may use water cooled by a wet cooling tower to cool buildings without operating a chiller. Often a plate-and-frame heat exchanger may be inserted between, for example, the cooling tower and chilled water loops.

To recap, an economizer controller system recognition approach may incorporate checking for connected sensors to an economizer controller of an economizer controller system, determining a control type of the connected sensors, repopulating a menu structure based on the control type, updating a user interface of the economizer controller system, and repeating the approach as desired or needed. The repopulating the menu structure may be automatic.

The economizer controller system may have a configuration, and the configuration may incorporate one or more combinations of sensing. The one or more combinations of sensing may incorporate mixed air temperature sensing, outdoor air temperature sensing, return air sensing, outdoor air humidity sensing, return air humidity sensing, discharge air temperature sensing, discharge air humidity sensing, and/or other applicable sensing.

The economizer controller system may incorporate one or more control types. The one or more control types may incorporate single ended drybulb control, differential drybulb control, single ended enthalpy control, differential enthalpy control, and/or other applicable control.

The economizer controller system may have a configuration and a control type. The configuration and control type may incorporate a specific user interface population and setup requirements. The economizer controller system may have an automatic system configuration determination routine in firmware of an economizer controller of the system.

The economizer controller system may periodically perform the checking for connected sensors, determining the control type of the connected sensors, and repopulating the user interface menu structure based on the control type. A control type of a sensor may incorporate status of the system, setpoints, system setup, advanced settings, checkout of dampers and ducts, and/or other applicable items.

The economizer controller system may incorporate an economizer controller, a rooftop economizer unit connected to the economizer controller, and a thermostat connected to the economizer controller and to the rooftop economizer unit. The economizer controller system may further incorporate an economizer damper actuator connected to the economizer controller.

This system may even further incorporate an outdoor air temperature sensor, a mixed air temperature sensor, an outdoor humidity sensor, a discharge air temperature sensor, a return air temperature sensor, a discharge air humidity sensor, a return air humidity sensor and/or a CO2 sensor connected to the economizer controller. One or more other applicable sensors may be connected to the economizer controller. The system may also have a communicating demand control actuator connected to the economizer controller.

A system having a recognition system with a user interface populating, may incorporate an economizer controller. The system may have a user interface connected to the economizer controller, a sensor checker for detecting sensors connected to the economizer controller, a type indicator for indicating a control type of the sensors, a mechanism for populating and/or repopulating a menu structure of the user interface, and/or other applicable mechanisms as appropriate. The repopulating the menu structure may be automatic. The sensor checker, type indicator and/or the mechanism for populating (and/or repopulating) may enable a plug and play aspect of the economizer controller.

The system may further incorporate a thermostat connected to the economizer controller, and an economizer rooftop unit connected to the mechanism for populating and/or repopulating and the thermostat.

An approach for updating a user interface of an economizer system, may incorporate providing an economizer controller having a user interface, providing a menu structure for the user interface, detecting sensors connected to the economizer controller, identifying a control type of the sensors connected to the economizer controller, and populating and/or repopulating the menu structure based on control type. The populating and/or repopulating the menu structure may be automatic. The economizer controller may have plug and play recognition.

U.S. Pat. Nos. 6,161,764, 4,570,448, and 7,434,413 may be relevant. U.S. Pat. No. 6,161,764, issued Dec. 19, 2000, is hereby incorporated by reference. U.S. Pat. No. 4,570,448, issued Feb. 18, 1986, is hereby incorporated by reference. U.S. Pat. No. 7,434,413, issued Oct. 14, 2008, is hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. An economizer controller comprising:
    a plug and play recognition system configured to detect sensors connected to the economizer controller and populate a user interface based on the sensors detected; and
    firmware including an automatic system configuration determination routine; and
    wherein the automatic system configuration determination routine is configured to implement at least a portion of the plug and play recognition system.

2. The economizer controller of claim 1, wherein the plug and play recognition system includes a sensor checker configured to detect the sensors connected to the economizer controller.

3. The economizer controller of claim 2, wherein the sensor checker is configured to indicate a control type of the sensors detected.

4. The economizer controller of claim 1, wherein the plug and play recognition system includes a mechanism for populating the user interface with a menu structure based on a control type of the sensors detected.

5. The economizer controller of claim 1, wherein the automatic system configuration determination routine is periodically executed to detect sensors connected to the economizer controller and populate a user interface based on the sensors detected.

6. The economizer controller of claim 1, wherein:
    at least one of the sensors detected comprises a demand control ventilation (DCV) sensor; and
    the economizer controller is configured to implement demand controlled ventilation using a heating, ventilation, and air conditioning (HVAC) economizer system in response to detecting the DCV sensor.

7. The economizer controller of claim 1, wherein:
    at least one of the sensors detected comprises a carbon dioxide (CO2) sensor; and
    the economizer controller is configured to repopulate the user interface to include a demand controlled ventilation setting in response to detecting the CO2 sensor.

8. A method of operating an economizer controller, the method comprising:
    running a plug and play recognition routine using the economizer controller; and
    executing a system configuration determination routine using the economizer controller to repeat the running of the plug and play sensor recognition routine.

9. The method of claim 8, wherein the system configuration determination routine is stored in firmware of the economizer controller.

10. The method of claim 8, wherein the executing the system configuration determination routine is configured to occur during operation of the economizer controller.

11. The method of claim 8, wherein the executing the system configuration determination routine is automatically repeated by the economizer controller.

12. The method of claim 8, wherein running the plug and play recognition routine comprises:
    discovering one or more sensors connected to the economizer controller; and
    populating a menu structure in response to the one or more sensors discovered.

13. The method of claim 12, wherein:
the discovering one or more sensors connected to the economizer controller includes detecting a control types of the one or more sensors detected; and
the populating the menu structure in response to the one or more sensors discovered is in accordance with the control types of the one or more sensors detected.

14. The method of claim 12, wherein:
at least one of the one or more sensors discovered comprises a demand controlled ventilation (DCV) sensor; and
the DCV sensor enables the economizer controller to implement demand controlled ventilation using a heating, ventilation, and air conditioning (HVAC) economizer system.

15. The method of claim 12, wherein:
at least one of the one or more sensors discovered comprises a carbon dioxide (CO2) sensor; and
a CO2 level determined by the CO2 sensor causes the economizer controller to change a position of a damper of a heating, ventilation, and air conditioning (HVAC) economizer system.

16. The method of claim 12, wherein:
at least one of the one or more sensors discovered comprises a carbon dioxide (CO2) sensor; and
in response to discovering the CO2 sensor, repopulating the menu structure to include a demand controlled ventilation setting.

17. The method of claim 12, wherein:
at least one of the one or more sensors discovered comprises an enthalpy sensor; and
the enthalpy sensor enables the economizer controller to implement free cooling using outside air.

18. A method of enabling a plug and play aspect of an economizer controller, the method comprising:
detecting sensors connected to the economizer controller;
identifying a control type of the sensors connected to the economizer controller; and
populating a menu structure of a user interface of the economizer controller based on the control type of the sensors connected to the economizer controller.

19. The method of claim 18, further comprising automatically periodically repeating the detecting, the identifying, and the populating.

20. The method of claim 18, further comprising executing a system configuration determination routine stored in firmware of the economizer controller to perform the detecting, the identifying, and the populating.

* * * * *